(12) United States Patent
Nagasaki et al.

(10) Patent No.: US 8,919,976 B2
(45) Date of Patent: Dec. 30, 2014

(54) LIGHT SOURCE DEVICE AND LIGHTING DEVICE

(75) Inventors: Atsushi Nagasaki, Tokyo (JP); Takashi Sugiyama, Tokyo (JP); Yasuyuki Kawakami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 157 days.

(21) Appl. No.: 13/480,459

(22) Filed: May 24, 2012

(65) Prior Publication Data

US 2012/0314411 A1 Dec. 13, 2012

(30) Foreign Application Priority Data

May 24, 2011 (JP) ................................. 2011-115438

(51) Int. Cl.
| | |
|---|---|
| *F21V 9/16* | (2006.01) |
| *F21V 33/00* | (2006.01) |
| *F21V 9/00* | (2006.01) |
| *H01L 33/00* | (2010.01) |
| *F21S 8/10* | (2006.01) |
| *G03B 21/20* | (2006.01) |
| *G02B 27/14* | (2006.01) |
| *F21Y 101/02* | (2006.01) |
| *F21V 7/05* | (2006.01) |
| *F21V 7/22* | (2006.01) |

(52) U.S. Cl.
CPC ............... *F21S 48/1145* (2013.01); *F21V 9/00* (2013.01); *F21V 9/16* (2013.01); *G03B 21/204* (2013.01); *F21S 48/214* (2013.01); *G02B 27/14* (2013.01); *F21Y 2101/02* (2013.01); *F21V 7/05* (2013.01); *F21V 7/22* (2013.01)
USPC ................ 362/84; 362/253; 362/293; 257/98

(58) Field of Classification Search
CPC ................ F21K 9/56; F21V 9/00; F21V 9/16
USPC ................................ 362/84, 253, 293; 257/98
See application file for complete search history.

(56) References Cited

U.S. PATENT DOCUMENTS

| | | | | | |
|---|---|---|---|---|---|
| 4,882,617 | A | * | 11/1989 | Vriens | ........................... 348/779 |
| 5,813,753 | A | * | 9/1998 | Vriens et al. | ................... 362/293 |
| 6,155,699 | A | * | 12/2000 | Miller et al. | ................... 362/293 |
| 7,123,796 | B2 | * | 10/2006 | Steckl et al. | .................... 385/40 |

(Continued)

FOREIGN PATENT DOCUMENTS

JP 2009-266437 A 11/2009

*Primary Examiner* — Robert May
*Assistant Examiner* — Alexander Garlen
(74) *Attorney, Agent, or Firm* — Kenealy Vaidya LLP

(57) ABSTRACT

A light source device can include a solid-state light source configured to emit blue light as excitation light and a phosphor section which is excited by the excitation light from the solid-state light source and which emits fluorescent light longer in wavelength than the light emitted from the solid-state light source. In the light source device, a wavelength selective member configured to transmit the excitation light from the solid-state light source and to reflect the fluorescent light from the phosphor section can be provided between the phosphor section and the solid-state light source. The size of the wavelength selective member can be less than the size of the phosphor section which can be greater than the size of the excitation light spot irradiated with the solid-state light source.

18 Claims, 13 Drawing Sheets

(56) References Cited

U.S. PATENT DOCUMENTS

| | | |
|---|---|---|
| 7,157,839 B2 * | 1/2007 | Ouderkirk et al. ............ 313/111 |
| 7,703,942 B2 * | 4/2010 | Narendran et al. ........... 362/231 |
| 7,709,811 B2 * | 5/2010 | Conner ..................... 250/459.1 |
| 7,800,287 B2 * | 9/2010 | Zheng et al. ................. 313/112 |
| 7,845,822 B2 * | 12/2010 | Bierhuizen et al. .......... 362/230 |
| 8,096,668 B2 * | 1/2012 | Abu-Ageel ..................... 362/84 |
| 2011/0157865 A1 * | 6/2011 | Takahashi et al. .............. 362/84 |
| 2013/0100635 A1 * | 4/2013 | Xu et al. ........................ 362/19 |

* cited by examiner

→ EXCITATION LIGHT (Blue Light)
⇒ FLUORESCENT LIGHT (Yellow Light)

LIGHT SOURCE DEVICE AND LIGHTING DEVICE

This application claims the priority benefit under 35 U.S.C. §119 of Japanese Patent Application No. 2011-115438 filed on May 24, 2011, which is hereby incorporated in its entirety by reference.

TECHNICAL FIELD

The presently disclosed subject matter relates to a light source device and a lighting device.

BACKGROUND ART

Conventionally, for example, as shown in FIG. 1, Japanese Patent Application Laid-Open Publication No. 2009-266437 discloses a light source device which can include an LED module 103 configured to emit blue light as excitation light and a phosphor (such as a phosphor plate) 104 which is excited by the excitation light from the LED module 103 so as to emit yellow fluorescent light. The light source device is designed to mix the blue light and the yellow light to produce white light (pseudo white light). In this light source device, a method for improving the efficiency of light utilization has been suggested. The method can include disposing, between the LED module 103 and the phosphor plate 104, a wavelength selective filter 106 which transmits the blue light from the LED module 103 and reflects the yellow light emitted from the phosphor plate 104. Note that in FIG. 1, reference numeral 108 denotes a phosphor securing transparent body and reference numeral 107 denotes the beams of light (the excitation light and the fluorescent light) extracted from a light extraction surface 104a of the phosphor plate 104-.

In the structure of FIG. 1, the blue light from the LED module 103 can be incident upon the phosphor plate 104 after having been transmitted through the phosphor securing transparent body 108 and the wavelength selective filter 106. Part of the excitation light incident upon the phosphor plate 104 can be transmitted through the phosphor plate 104 and exit from the light extraction surface 104a of the phosphor plate 104. Meanwhile, the other part of the excitation light may be used in the phosphor plate 4 to excite the phosphor plate 4 to emit the above-described fluorescent light or may be reflected by the light extraction surface 104a and directed to the wavelength selective filter 106 so as to be transmitted through the wavelength selective filter 106. Accordingly, the blue light from the LED module 103 is emitted mainly from the portion of the phosphor plate 104 (excitation light irradiated spot) that is irradiated with the excitation light.

In contrast to this, the phosphor plate 104 isotropically emits the yellow light, so that part of the yellow light is emitted from the light extraction surface 104a of the phosphor plate 104, whereas the other part is reflected by the light extraction surface 104a and directed to the wavelength selective filter 106 so as to be selectively reflected by the wavelength selective filter 106. Then, part of the reflected light of the yellow light which has been selectively reflected by the wavelength selective filter 106 can exit from the light extraction surface 104a, whereas the other part of the light may be reflected by the extraction surface 104a and directed again to the wavelength selective filter 106 so as to become what is called multiple reflection light, which is further selectively reflected by the wavelength selective filter 106. Accordingly, the yellow light is emitted from the entire phosphor plate 104.

In addition to this, the wavelength selective filter 106 causes the yellow light to be emitted at a greater intensity from the peripheral portion.

To facilitate assembly, the phosphor plate 104 is typically made larger than the excitation light irradiated spot. However, in this case, the yellow light emitting region having the entire phosphor plate 104 as an emission region is larger than the blue light emitting region which is generally the same in size as the excitation light irradiated spot. FIG. 2 is a view illustrating the phosphor plate 104 when it emits light. In FIG. 2, the beams of blue light and yellow light are mixed into white light in a region 110 which is generally the same in size as the excitation light irradiated spot. However, the yellow light is found in a region 111 outside the region 110 that is generally the same in size as the excitation light irradiated spot.

Accordingly, as shown in FIG. 3, with a lighting device which is designed such that the light source device of FIG. 1 is used for projection under magnification onto a predetermined projection surface using a lens assembly or the like, there was the problem in which variations in color of the light source are reflected by the projection surface, thus causing variations in radiation (variations in color) with the central portion being blue white and the peripheral portion being yellow. Note that in FIG. 3, reference numeral 102 denotes the lens assembly and reference numeral 105 denotes the projection surface.

SUMMARY

The presently disclosed subject matter was devised in view of these and other characteristics, problems and features and in association with the conventional art. According to an aspect of the presently disclosed subject matter, a light source device can include a solid-state light source configured to emit blue light as excitation light and a wavelength conversion section (such as a phosphor section) that is excited by the excitation light from the solid-state light source to emit fluorescent light longer in wavelength than the light emitted from the solid-state light source. An embodiment of the light source device can be configured to prevent variations in radiation (variations in color) by making the size of blue light emitting region generally the same in size as the fluorescent light emitting region without reducing the efficiency of light utilization. According to another aspect of the presently disclosed subject matter, a lighting device can include such a light source device providing the above advantageous effects.

According to another aspect of the presently disclosed subject matter, a light source device can include: a solid-state light source configured to emit blue light as excitation light; a wavelength conversion section (phosphor section) configured to be excited by the excitation light from the solid-state light source so as to emit fluorescent light longer in wavelength than the light emitted from the solid-state light source; and wavelength selective means provided between the wavelength conversion section and the solid-state light source and configured to transmit the excitation light from the solid-state light source and to reflect the fluorescent light from the wavelength conversion section. In this light source device, the wavelength selective means can have a size within the range which is less than the size of the wavelength conversion section and which is greater than the size of the excitation light spot irradiated with the solid-state light source by the amount of the handling tolerance provided for adjusting the position of the excitation light spot irradiated with the solid-state light source.

In this light source device with the above configuration, the wavelength selective means can have a size which is equal to or greater than the size of the excitation light spot irradiated with the solid-state light source within the range of 0.0 mm to 0.2 mm.

Further, in this light source device with the above configuration, a region other than the region where the wavelength selective means is disposed can be provided with any one of second wavelength selective means configured to reflect the excitation light from the solid-state light source and to transmit the fluorescent light from the wavelength conversion section and reflective means configured to reflect the excitation light from the solid-state light source and the fluorescent light from the wavelength conversion section.

According to a further aspect of the presently disclosed subject matter, a light source device can include: a solid-state light source configured to emit blue light as excitation light; a wavelength conversion section (phosphor section) configured to be excited by the excitation light from the solid-state light source so as to emit fluorescent light longer in wavelength than the light emitted from the solid-state light source; and antireflective means provided between the wavelength conversion section and the solid-state light source, the antireflective means configured to prevent the reflection of the excitation light from the solid-state light source upon being incident on the wavelength conversion section. In the light source device, the antireflective means can have a size within the range which is less than the size of the wavelength conversion section and which is greater than the size of the excitation light spot irradiated with the solid-state light source by the amount of the handling tolerance provided for adjusting the position of the excitation light spot irradiated with the solid-state light source. Further, in the light source device, a region other than the region where the antireflective means is disposed can be provided with second wavelength selective means configured to reflect the excitation light from the solid-state light source and to transmit the fluorescent light from the wavelength conversion section and reflective means configured to reflect the excitation light from the solid-state light source and the fluorescent light from the wavelength conversion section.

In this light source device with the above configuration, the antireflective means can have a size which is equal to or greater than the size of the excitation light spot irradiated with the solid-state light source within the range of 0.0 mm to 0.2 mm.

According to still further another aspect of the presently disclosed subject matter, a light source device can include: a solid-state light source configured to emit blue light as excitation light; a wavelength conversion section (phosphor section) configured to be excited by the excitation light from the solid-state light source so as to emit fluorescent light longer in wavelength than the light emitted from the solid-state light source; a first section provided between the wavelength conversion section and the solid-state light source, the region having a size within the range which is less than the size of the wavelength conversion section and which is greater than the size of the excitation light spot irradiated with the solid-state light source by the amount of the handling tolerance provided for adjusting the position of the excitation light spot irradiated with the solid-state light source. Further, in the light source device, a second section other than the aforementioned first section can be provided with any one of second wavelength selective means configured to reflect the excitation light from the solid-state light source and to transmit the fluorescent light from the wavelength conversion section and reflective means configured to reflect the excitation light from the solid-state light source and the fluorescent light from the wavelength conversion section.

Further, in this light source device with the above configuration, the first section can have a size which is equal to or greater than the size of the excitation light spot irradiated with the solid-state light source within the range of 0.0 mm to 0.2 mm.

According to still further another aspect of the presently disclosed subject matter, a lighting device can be configured to include the light source device as set forth in any one of the above configurations.

One of the basic configurations as described above can include the solid-state light source configured to emit blue light as excitation light and the wavelength conversion section or phosphor section configured to be excited by the excitation light from the solid-state light source so as to emit fluorescent light longer in wavelength than the light emitted from the solid-state light source. Further provided between the phosphor section and the solid-state light source is the wavelength selective means (for example, a wavelength selective filter) which can have the property of transmitting the excitation light from the solid-state light source and reflecting the fluorescent light from the phosphor section. The wavelength selective means can have a size within the range which is less than the size of the phosphor section and which is greater than the size of the excitation light spot irradiated with the solid-state light source by the amount of the handling tolerance provided for adjusting the position of the excitation light spot irradiated with the solid-state light source. This makes it possible to prevent variations in radiation (variations in color) by making the blue light emitting region and the fluorescent light emitting region generally the same in size without reducing the efficiency of light utilization.

Another basic configuration as described above can include the solid-state light source configured to emit blue light as excitation light and the wavelength conversion section or phosphor section configured to be excited by the excitation light from the solid-state light source so as to emit fluorescent light longer in wavelength than the light emitted from the solid-state light source. Further provided between the phosphor section and the solid-state light source is the antireflective means (for example, antireflective film) configured to prevent the reflection of the excitation light from the solid-state light source upon being incident of the phosphor section. The antireflective means can have a size within the range which is less than the size of the phosphor section and which is greater than the size of the excitation light spot irradiated with the solid-state light source by the amount of the handling tolerance provided for adjusting the position of the excitation light spot irradiated with the solid-state light source. A region other than the region where the antireflective means is disposed can be provided with the second wavelength selective means which can have the property of reflecting the excitation light from the solid-state light source and transmitting the fluorescent light from the phosphor section or alternatively provided with the reflective means configured to reflect the excitation light from the solid-state light source and the fluorescent light from the phosphor section. This also makes it possible to prevent variations in radiation (variations in color) by making the blue light emitting region and the fluorescent light emitting region generally the same in size without reducing the efficiency of light utilization.

Still another basic configuration as described above can include the solid-state light source configured to emit blue light as excitation light and the wavelength conversion section or phosphor section configured to be excited by the excitation light from the solid-state light source so as to emit fluorescent light longer in wavelength than the light emitted from the solid-state light source. Further provided between the phosphor section and the solid-state light source is the first section of a size within the range which is less than the size of the phosphor section and which is greater than the size of the excitation light spot irradiated with the solid-state light source by the amount of the handling tolerance provided for adjusting the position of the excitation light spot irradiated with the solid-state light source. A second section other than the first section can be provided with the second wavelength selective means which can have the property of reflecting the excitation light from the solid-state light source and transmitting the fluorescent light from the phosphor section or alternatively provided with the reflective means configured to reflect the excitation light from the solid-state light source and the fluorescent light from the phosphor section. This also makes it possible to prevent variations in radiation (variations in color) by making the blue light emitting region and the fluorescent light emitting region generally the same in size without reducing the efficiency of light utilization.

According to another aspect of the presently disclosed subject matter, a light source device can include a solid-state light source configured to emit blue light as excitation light and a phosphor section which is excited by the excitation light from the solid-state light source and which emits fluorescent light longer in wavelength than the light emitted from the solid-state light source. The light source device can provide a blue light emitting region and a fluorescent light emitting region in generally the same size so as to prevent variations in radiation (variations in color) without reducing the efficiency of light utilization. In the light source device, a wavelength selective member configured to transmit the excitation light from the solid-state light source and to reflect the fluorescent light from the phosphor section can be provided between the phosphor section and the solid-state light source. The wavelength selective member can have a size within a range which is less than the size of the phosphor section and which is greater than the size of the excitation light spot irradiated with the solid-state light source by the amount of the handling tolerance provided for adjusting the position of the excitation light spot irradiated with the solid-state light source.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to light source devices of the presently disclosed subject matter with reference to the accompanying drawings in accordance with exemplary embodiments.

Figure 4:
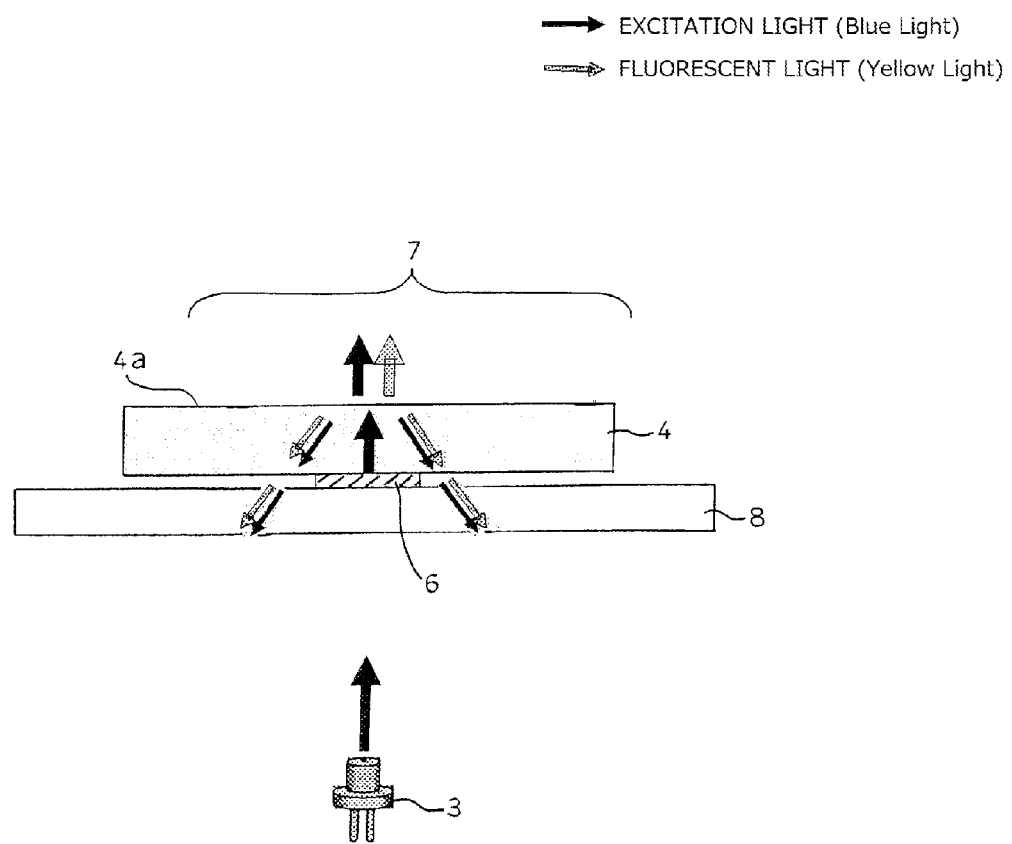
FIG. 4 is a schematic cross-sectional view illustrating a light source device according to a first structural example made in accordance with principles of the presently disclosed subject matter.

FIG. 4 is a schematic cross-sectional view illustrating a light source device according to a first structural example made in accordance with principles of the presently disclosed subject matter. Referring to FIG. 4, the light source device according to the first structural example can include a solid-state light source 3 configured to emit blue light as excitation light and a phosphor section (a phosphor plate) 4 which is the wavelength conversion section and can be excited by the excitation light from the solid-state light source 3 so as to emit fluorescent light (for example, yellow light) which is longer in wavelength than the light emitted from the solid-state light source. Further provided between the phosphor section 4 and the solid-state light source 3 can be a wavelength selective member (for example, wavelength selective filter) 6 which can have the property of transmitting the excitation light from the solid-state light source 3 and reflecting the fluorescent light from the phosphor section 4.

Here, the first structural example of the presently disclosed subject matter is configured such that the wavelength selective member 6 can have a size within the range which is smaller than the phosphor section 4 and which is greater than the excitation light spot irradiated with the solid-state light source 3 by the amount of the handling tolerance provided for adjusting the position of the excitation light spot irradiated with the solid-state light source 3.

More specifically, the wavelength selective member 6 can have a size (for example, an diameter, or outer peripheral length) which is equal to or greater than the size (for example, diameter or outer peripheral length) of the excitation light spot irradiated with the solid-state light source 3 within the range of 0.0 mm to 0.2 mm. The wavelength selective member 6 can be configured such that the entire wavelength selective member 6 is concealed behind the phosphor plate 4 when viewed from a front of the light source device and along an optical axis of the light source device (the optical axis extending from the light source 3 through and substantially perpendicular to the phosphor plate 4). The phosphor plate 4 can take up a larger area when viewed along an optical axis of the light source device than an area of the wavelength selective member 6. In addition, the area of intersection between the excitation light emitted from the light source 3 and the wavelength selective member 6 can be substantially equal to or less than the total area of the wavelength selective member 6 as viewed from an optical axis of the light source device. Furthermore, the total volume of the wavelength selective member 6 can be less than the total volume taken up by the phosphor plate 4.

Note that in FIG. 4, reference numeral 8 denotes a phosphor securing transparent body, and reference numeral 7 denotes the light (including excitation light (blue light) and fluorescent light (for example, yellow light)) extracted from a light extraction surface 4*a* of the phosphor section 4. Furthermore, in each example below, for convenience of explanation, the fluorescent light emitted from the phosphor section 4 is assumed to be yellow light.

In the structure of FIG. 4, the excitation light from the solid-state light source 3 can be transmitted through the phosphor securing transparent body 8 and the wavelength selective member 6 and then incident upon the phosphor section 4. Part of the excitation light incident upon the phosphor section 4 can be transmitted through the phosphor section 4 and then emitted from the light extraction surface 4*a* of the phosphor section 4. Meanwhile, the other part of the excitation light may be used in the phosphor section 4 to excite the phosphor section 4 to emit the fluorescent light or may be reflected by the light extraction surface 4*a* and go back through the phosphor section 4 toward the solid-state light source 3 so as to be transmitted through the phosphor securing transparent body 8 and emitted toward the solid-state light source 3. Accordingly, the excitation light from the solid-state light source 3 can be mainly emitted from the light extraction surface 4*a* corresponding to the portion (excitation light irradiated spot) of the phosphor section 4 which is irradiated with the excitation light.

In contrast to this, the fluorescent light from the phosphor section 4 can be emitted isotropically, so that part of the fluorescent light can be emitted from the light extraction surface 4*a* of the phosphor section 4, whereas the other part may be, for example, reflected by the light extraction surface 4*a* to go back toward the solid-state light source 3. At this time, the fluorescent light back at the region where the wavelength selective member 6 is provided can be reflected by the wavelength selective member 6 and directed to the light extraction surface 4*a* of the phosphor section 4. This makes it possible to improve the efficiency of light utilization. Meanwhile, the fluorescent light back at a region other than the region where the wavelength selective member 6 is provided can be transmitted through the phosphor securing transparent body 8 and emitted toward the solid-state light source 3. Accordingly, the fluorescent light from the phosphor section 4 can also be emitted mainly from the light extraction surface 4*a* corresponding to the portion (excitation light irradiated spot) of the phosphor section 4 which is irradiated with the excitation light.

Figure 1:
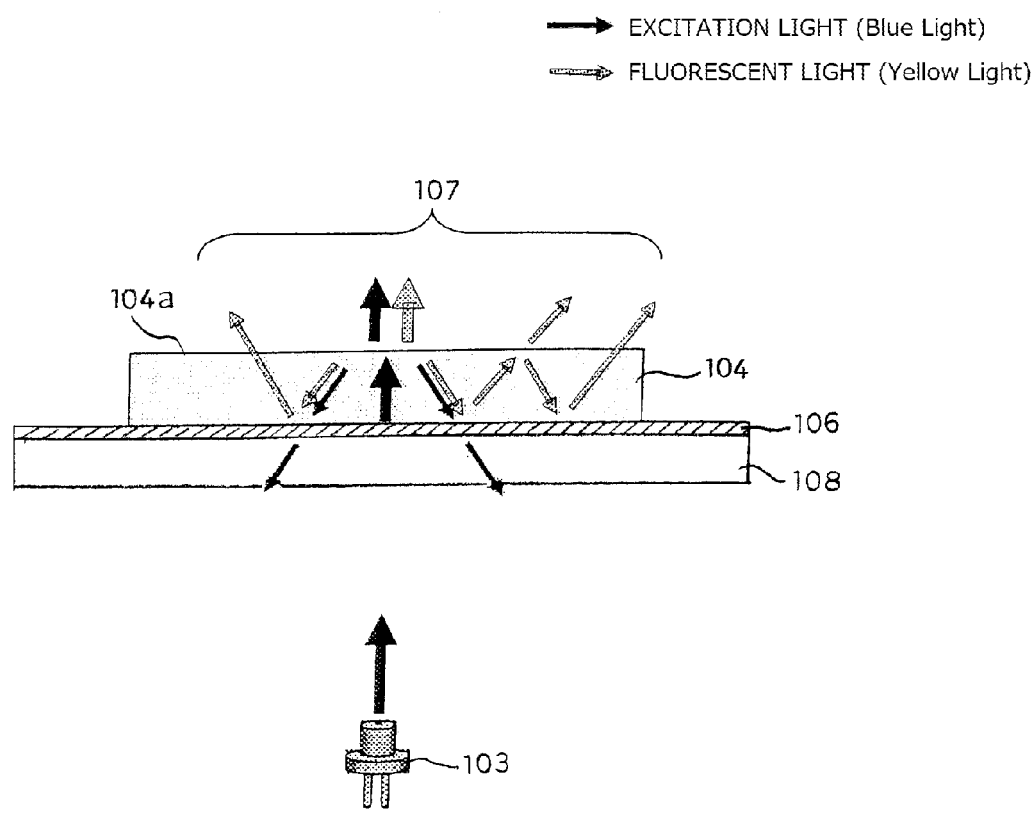
FIG. 1 is a schematic cross-sectional view illustrating a conventional light source device.
Figure 2:
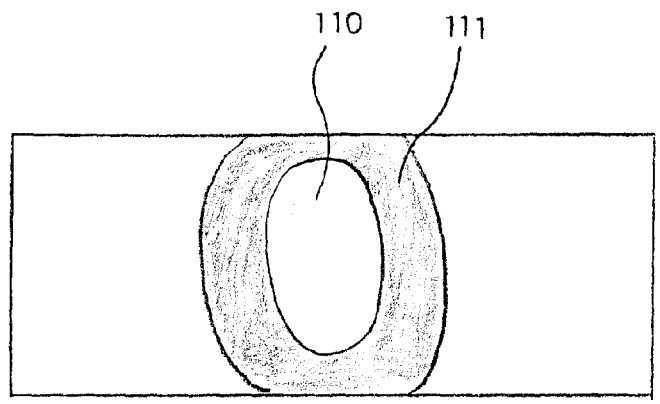
FIG. 2 is a front view illustrating a conventional phosphor plate emitting light.
Figure 3:
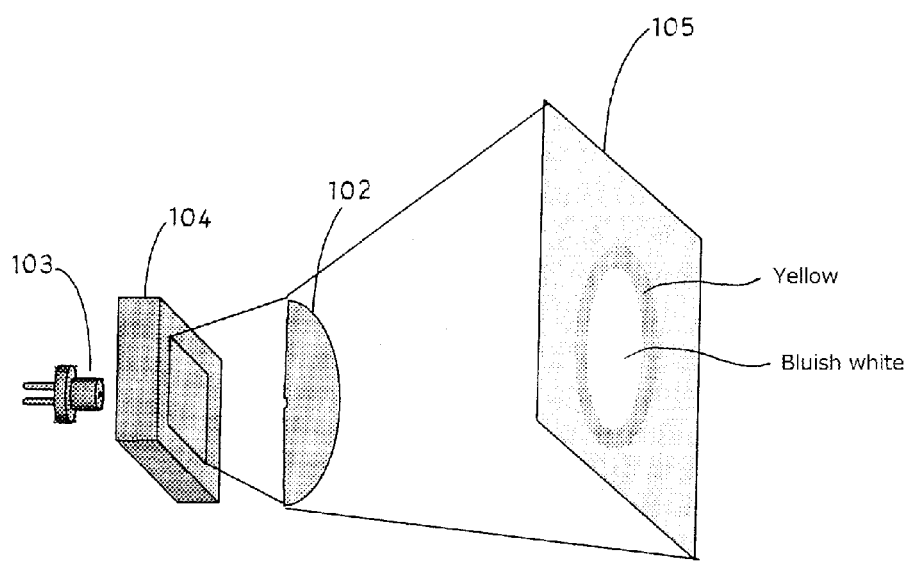
FIG. 3 is a schematic perspective view illustrating a lighting device for projection under magnification onto a predetermined projection surface using a lens assembly or the like with the conventional light source device of FIG. 1.

As described above, the structure of FIG. 4 is provided with the wavelength selective member 6 of a size within the range which is smaller than the phosphor section 4 and which is greater than the excitation light spot irradiated with the solid-state light source 3 by the amount of the handling tolerance provided for adjusting the position of the excitation light spot irradiated with the solid-state light source 3. This makes it possible to enhance the efficiency of light utilization, while the blue light emitting region and the yellow light emitting region from the light extraction surface 4*a* of the phosphor section 4 can have generally the same size as that of the excitation light irradiated spot, allowing the beams of blue light and yellow light to be mixed into white light without causing variations in radiation (variations in color). That is, the structure of FIG. 4, in which the blue light emitting region and the yellow light emitting region from the light extraction surface 4*a* of the phosphor section 4 can have generally the same size as that of the excitation light irradiated spot, can effectively prevent variations in radiation (variations in color) which occur in the structure of FIG. 1 causing yellow light to appear outside the region of generally the same size as that of the excitation light irradiated spot.

Accordingly, a lighting device which utilizes the exemplary light source device of FIG. 4 for projection under magnification onto a predetermined projection surface using a lens assembly or the like would advantageously cause little or no color variations (variations in radiation) of the light source on the projection surface.

Figure 5:
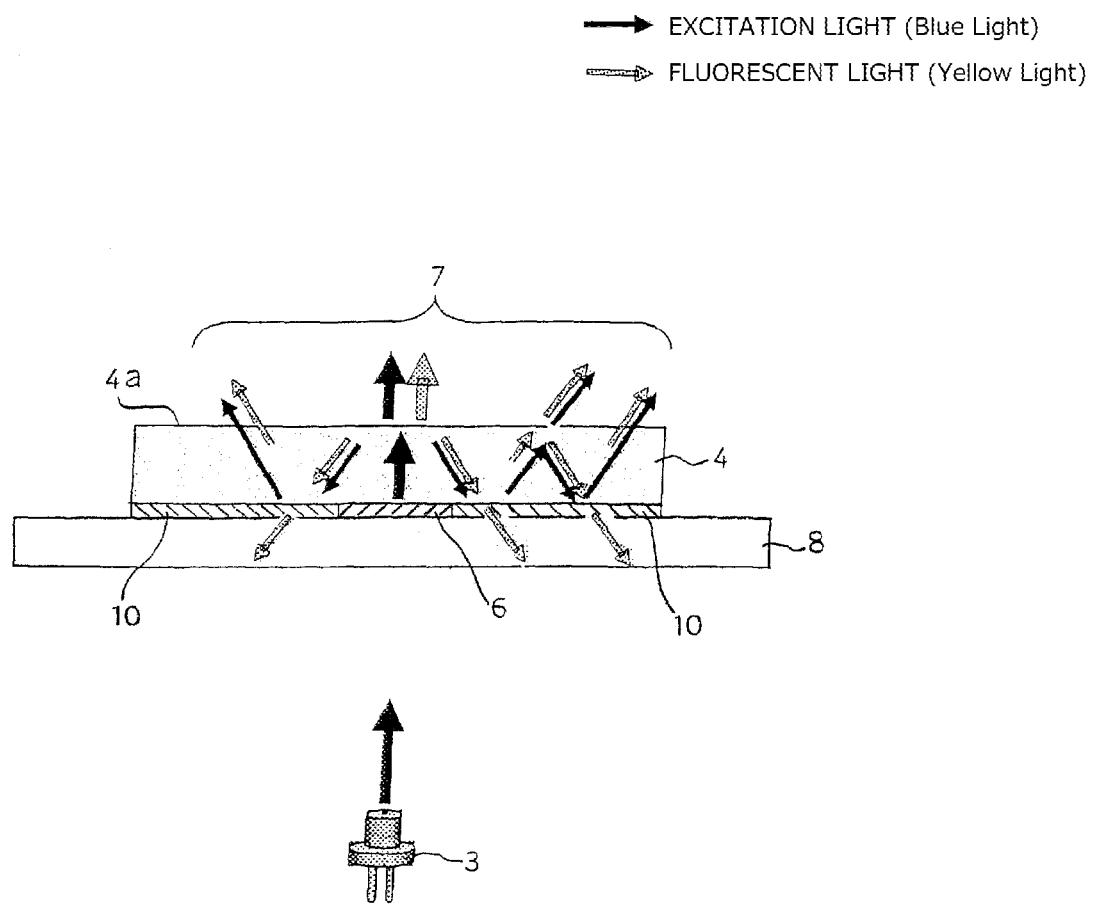
FIG. 5 is a schematic cross-sectional view illustrating a light source device according to a second structural example made in accordance with principles of the presently disclosed subject matter.

FIG. 5 is a schematic cross-sectional view illustrating a light source device according to a second structural example made in accordance with principles of the presently disclosed subject matter. Note that in FIG. 5, the components similar to those of FIG. 4 are denoted by the same reference numerals and can have the same or similar geometric dimensions and relationships to other structures as described above with regard to similar components of other disclosed embodiments. Referring to FIG. 5, the light source device according to the second structural example can be configured such that in the light source device according to the first structural example shown in FIG. 4, a region other than the region where the wavelength selective member 6 is disposed can be provided with second wavelength selective member (for example, a second wavelength selective filter) 10 which can have the property of reflecting the excitation light from the solid-state light source 3 and transmitting the fluorescent light from the phosphor section 4.

In the structure of FIG. 5, the excitation light from the solid-state light source 3 can be transmitted through the phosphor securing transparent body 8 and the wavelength selective member 6, and then incident upon the phosphor section 4. Part of the excitation light incident upon the phosphor section 4 can be transmitted through the phosphor section 4 and then emitted from the light extraction surface 4*a* of the phosphor section 4. Meanwhile, the other part may be used in the phosphor section 4 to excite the phosphor section 4 to emit the fluorescent light or may be reflected by the light extraction surface 4*a* and directed to the second wavelength selective member 10 so as to be selectively reflected by the second wavelength selective member 10. Then, part of the reflected light of the excitation light having been selectively reflected by the second wavelength selective member 10 can be emitted from the light extraction surface 4*a*. Meanwhile, the other part can be reflected by the light extraction surface 4*a* and then directed to the second wavelength selective member 10 so as to create what is called multiple reflection light which is further selectively reflected by the second wavelength selective member 10. Here, the excitation light can excite the phosphor section 4 to cause the fluorescent light to be emitted from the phosphor section 4 when propagating through the phosphor section 4 as the aforementioned multiple reflection light. In the second structural example shown in FIG. 5, this allows the blue light emitting region and the yellow light emitting region from the light extraction surface 4a of the phosphor section 4 to be greater than the excitation light irradiated spot (allowing for further enhancing the efficiency of light utilization), and even when being greater than the excitation light irradiated spot, the beams of blue light and yellow light are mixed into white light without causing variations in radiation (variations in color). That is, in a region outside the excitation light irradiated spot, the excitation light and the fluorescent light can be emitted from the light extraction surface 4a of the phosphor section 4, while effectively preventing variations in radiation (variations in color) and further enhancing the efficiency of light utilization.

Note that in the second structural example shown in FIG. 5, the fluorescent light back at a region other than the region where the wavelength selective member 6 is provided can be transmitted through the second wavelength selective member 10 and then emitted toward the solid-state light source 3. Accordingly, in the second structural example shown in FIG. 5, the fluorescent light from the phosphor section 4 will not turn to the multiple reflection light.

As described above, the structure of FIG. 5 can be configured such that in the light source device according to the first structural example shown in FIG. 4, a region other than the region where the wavelength selective member 6 is disposed can be provided with the second wavelength selective member 10 which has the property of reflecting the excitation light from the solid-state light source 3 and transmitting the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 5 for projection under magnification onto a predetermined projection surface using a lens assembly or the like may advantageously cause little or no color variations (variations in radiation) of the light source on the projection surface.

Figure 6:
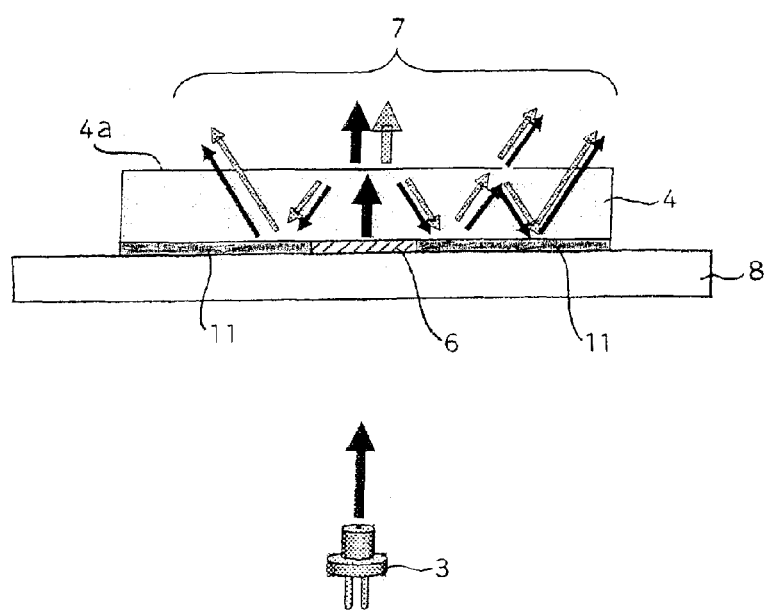
FIG. 6 is a schematic cross-sectional view illustrating a light source device according to a third structural example made in accordance with principles of the presently disclosed subject matter.

FIG. 6 is a schematic cross-sectional view illustrating a light source device according to a third structural example made in accordance with principles of the presently disclosed subject matter. Note that in FIG. 6, the components similar to those of FIG. 4 are denoted by the same reference numerals and can have the same or similar geometric dimensions and relationships to other structures as described above with regard to similar components of other disclosed embodiments. Referring to FIG. 6, the light source device according to the third structural example can be configured such that in the light source device according to the first structural example shown in FIG. 4, a region other than the region where the wavelength selective member 6 is disposed can be provided with a reflective member 11 configured to reflect the excitation light from the solid-state light source 3 and the fluorescent light from the phosphor section 4.

In the structure of FIG. 6, the excitation light from the solid-state light source 3 can be transmitted through the phosphor securing transparent body 8 and the wavelength selective member 6 and then incident upon the phosphor section 4. Part of the excitation light incident upon the phosphor section 4 can be transmitted through the phosphor section 4 and emitted from the light extraction surface 4a of the phosphor section 4. Meanwhile, the other part may be used in the phosphor section 4 to excite the phosphor section 4 to emit the fluorescent light or may be reflected by the light extraction surface 4a and directed to the reflective member 11 so as to be reflected by the reflective member 11. Then, part of the reflected light of the excitation light having been reflected by the reflective member 11 can be emitted from the light extraction surface 4a, while the other part can be reflected by the light extraction surface 4a and directed to the reflective member 11 so as to be what is called multiple reflection light which is further reflected by the reflective member 11.

Furthermore, in the structure of FIG. 6, the fluorescent light back at a region other than the region where the wavelength selective member 6 is provided can be reflected by the reflective member 11. Then, part of the reflected light of the fluorescent light having been reflected by the reflective member 11 can be emitted from the light extraction surface 4a, while the other part can be reflected by the light extraction surface 4a and directed to the reflective member 11 so as to be what is called multiple reflection light which is further reflected by the reflective member 11.

As such, in the structure of FIG. 6, both the excitation light and the fluorescent light are turned into multiple reflection light, so that even in a region outside the excitation light irradiated spot, the excitation light and the fluorescent light can be emitted from the light extraction surface 4a of the phosphor section 4 (even in a region greater than the excitation light irradiated spot, the beams of blue light and yellow light can be mixed into white light). This allows for effectively preventing variations in radiation (variations in color) and further enhancing the efficiency of light utilization.

As described above, the structure of FIG. 6 can be configured such that in the light source device according to the first structural example shown in FIG. 4, a region other than the region where the wavelength selective member 6 is disposed can be provided with the reflective member 11 to reflect the excitation light from the solid-state light source 3 and the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 6 for projection under magnification onto a predetermined projection surface using a lens assembly or the like may advantageously cause little or no color variations (variations in radiation) of the light source on the projection surface.

Figure 7:
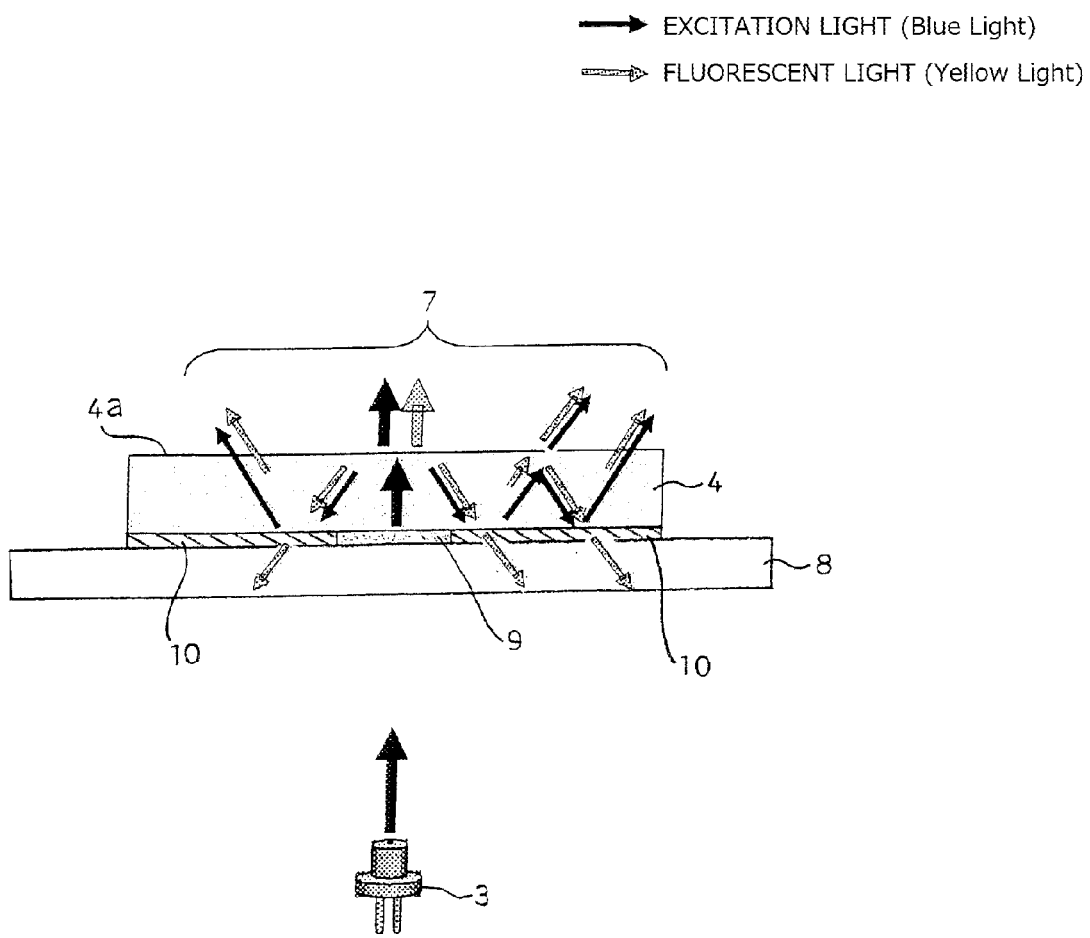
FIG. 7 is a schematic cross-sectional view illustrating a light source device according to a fourth structural example made in accordance with principles of the presently disclosed subject matter.

FIG. 7 is a schematic cross-sectional view illustrating a light source device according to a fourth structural example made in accordance with principles of the presently disclosed subject matter. Note that in FIG. 7, the components similar to those of FIGS. 4 and 5 are denoted by the same reference numerals and can have the same or similar geometric dimensions and relationships to other structures as described above with regard to similar components of other disclosed embodiments. Referring to FIG. 7, the light source device according to the fourth structural example includes the solid-state light source 3 configured to emit blue light as excitation light, and the phosphor section 4 which is excited by the excitation light from the solid-state light source 3 so as to emit the fluorescent light (for example, yellow light) which is longer in wavelength than the light emitted from the solid-state light source. Provided between the phosphor section 4 and the solid-state light source 3 can be an antireflective member (for example, antireflective film) 9 configured to prevent the reflection of the excitation light from the solid-state light source 3 on the phosphor section 4 upon entry thereto.

Here, in the fourth structural example of the presently disclosed subject matter, the antireflective member 9 can have a size within the range which is smaller than the phosphor section 4 and which is greater than the excitation light spot irradiated with the solid-state light source 3 by the amount of the handling tolerance provided for adjusting the position of the excitation light spot irradiated with the solid-state light source 3.

More specifically, the antireflective member 9 can have a size (for example, diameter or peripheral length) which is equal to or greater than the size (for example, diameter or peripheral length) of the excitation light spot irradiated with the solid-state light source 3 within the range of 0.0 mm to 0.2 mm.

Furthermore, the light source device according to the fourth structural example can be configured such that a region other than the region where the antireflective member 9 is disposed can be provided with the second wavelength selective member 10 which has the property of reflecting the excitation light from the solid-state light source 3 and transmitting the fluorescent light from the phosphor section 4.

In the structure of FIG. 7, the excitation light from the solid-state light source 3 can be transmitted through the phosphor securing transparent body 8 and the antireflective member 9 and then incident upon the phosphor section 4. At this time, since the antireflective member 9 can be provided to prevent the reflection of the excitation light from the solid-state light source 3 on the phosphor section 4 upon entry thereto, the excitation light from the solid-state light source 3 can be incident upon the phosphor section 4 with efficiency (with less reflection). This allows for enhancing the efficiency of light utilization. Part of the excitation light incident upon the phosphor section 4 can be transmitted through the phosphor section 4 and emitted from the light extraction surface 4*a* of the phosphor section 4. Meanwhile, the other part may be used in the phosphor section 4 to excite the phosphor section 4 to emit the fluorescent light or may be reflected by the light extraction surface 4*a* and directed to the second wavelength selective member 10 so as to be selectively reflected by the second wavelength selective member 10. Then, part of the reflected light of the excitation light having been selectively reflected by the second wavelength selective member 10 can be emitted from the light extraction surface 4*a*, while the other part can be reflected by the light extraction surface 4*a* and directed to the second wavelength selective member 10 so as to be what is called multiple reflection light which is further selectively reflected by the second wavelength selective member 10. Here, the excitation light can excite the phosphor section 4 to cause the fluorescent light to be emitted from the phosphor section 4 when propagating through the phosphor section 4 as the aforementioned multiple reflection light. In the fourth structural example shown in FIG. 7, this allows the blue light emitting region and the yellow light emitting region from the light extraction surface 4*a* of the phosphor section 4 to be greater than the excitation light irradiated spot (allowing for further enhancing the efficiency of light utilization), and even when being greater than the excitation light irradiated spot, the beams of blue light and yellow light can be mixed into white light without causing variations in radiation (variations in color). That is, in a region outside the excitation light irradiated spot, the excitation light and the fluorescent light can be emitted from the light extraction surface 4*a* of the phosphor section 4, while effectively preventing variations in radiation (variations in color) and further enhancing the efficiency of light utilization.

Note that in the fourth structural example shown in FIG. 7, the fluorescent light back at a region other than the region where the antireflective member 9 is provided can be transmitted through the second wavelength selective member 10 and then emitted toward the solid-state light source 3. Accordingly, in the fourth structural example shown in FIG. 7, the fluorescent light from the phosphor section 4 will not turn to the multiple reflection light.

As described above, in the structure of FIG. 7, a region other than the region where the antireflective member 9 is disposed can be provided with the second wavelength selective member 10 which has the property of reflecting the excitation light from the solid-state light source 3 and transmitting the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 7 for projection under magnification onto a predetermined projection surface using a lens assembly or the like may advantageously cause little or no color variations (variations in radiation) of the light source on the projection surface.

Figure 8:
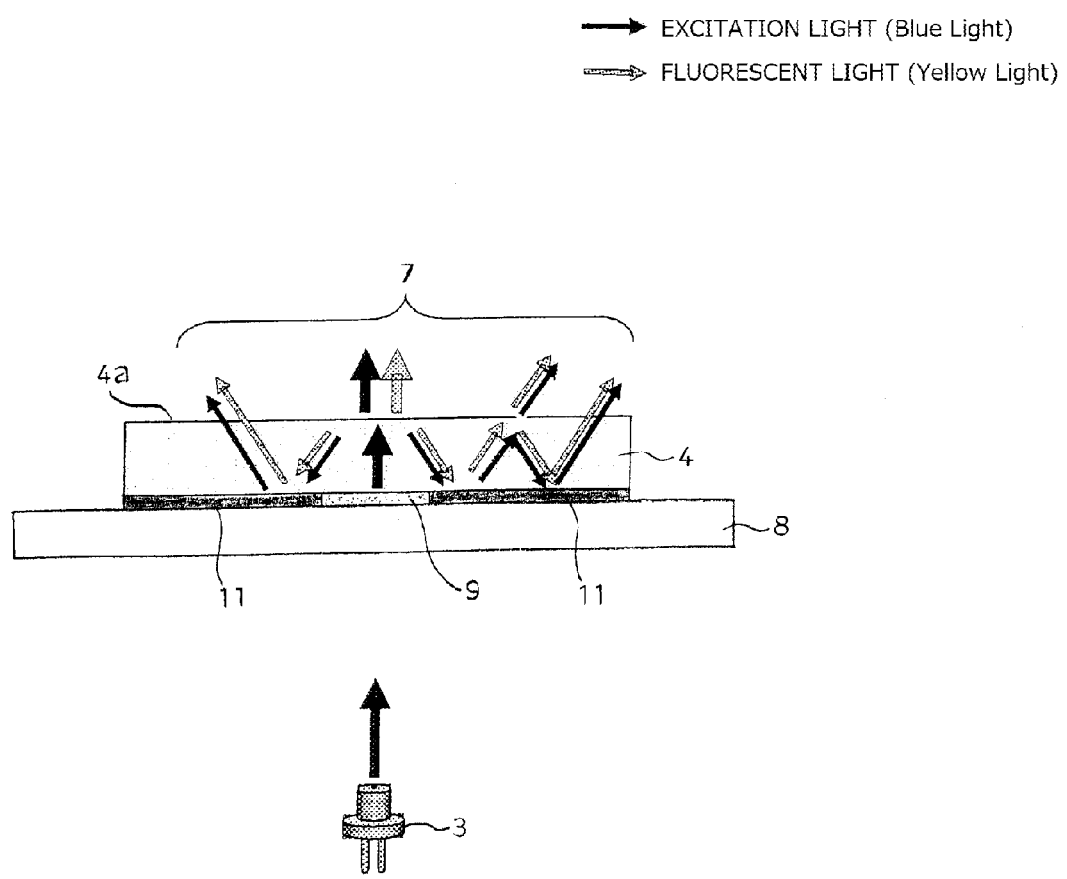
FIG. 8 is a schematic cross-sectional view illustrating a light source device according to a fifth structural example made in accordance with principles of the presently disclosed subject matter.

FIG. 8 is a schematic cross-sectional view illustrating a light source device according to a fifth structural example made in accordance with principles of the presently disclosed subject matter. Note that in FIG. 8, the components similar to those of FIGS. 6 and 7 are denoted by the same reference numerals and can have the same or similar geometric dimensions and relationships to other structures as described above with regard to similar components of other disclosed embodiments. Referring to FIG. 8, the light source device according to the fifth structural example can be configured such that in the light source device according to the fourth structural example, the reflective member 11 can be provided in place of the second wavelength selective member 10.

In the structure of FIG. 8, the excitation light from the solid-state light source 3 can be transmitted through the phosphor securing transparent body 8 and the antireflective member 9 and then incident upon the phosphor section 4. Part of the excitation light incident upon the phosphor section 4 can be transmitted through the phosphor section 4 and emitted from the light extraction surface 4*a* of the phosphor section 4. Meanwhile, the other part may be used in the phosphor section 4 to excite the phosphor section 4 to emit the fluorescent light or may be reflected by the light extraction surface 4*a* and directed to the reflective member 11 so as to be reflected by the reflective member 11. Then, part of the reflected light of the excitation light having been reflected by the reflective member 11 can be emitted from the light extraction surface 4*a*, whereas the other part can be reflected by the light extraction surface 4*a* and directed to the reflective member 11 so as to be what is called multiple reflection light which is further reflected by the reflective member 11.

Furthermore, in the structure of FIG. 8, the fluorescent light back at a region other than the region where the antireflective member 9 is provided can be reflected by the reflective member 11. Then, part of the reflected light of the fluorescent light having been reflected by the reflective member 11 can be emitted from the light extraction surface 4*a*, whereas the other part can be reflected by the light extraction surface 4*a* and directed to the reflective member 11 so as to be what is called multiple reflection light which is further reflected by the reflective member 11.

As such, in the structure of FIG. 8, both the excitation light and the fluorescent light can be turned into multiple reflection light, so that even in a region outside the excitation light irradiated spot, the excitation light and the fluorescent light can be emitted from the light extraction surface 4*a* of the phosphor section 4 (even in a region greater than the excitation light irradiated spot, the beams of blue light and yellow light are mixed into white light). This allows for effectively preventing variations in radiation (variations in color) and further enhancing the efficiency of light utilization.

As described above, the structure of FIG. 8 can be configured such that a region other than the region where the antireflective member 9 is disposed can be provided with the reflective member 11 to reflect the excitation light from the solid-state light source 3 and the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 8 for projection under magnification onto a predetermined projection surface using a lens assembly or the like may advantageously cause little or no color variations (variations in radiation) of the light source on the projection surface.

Figure 9:
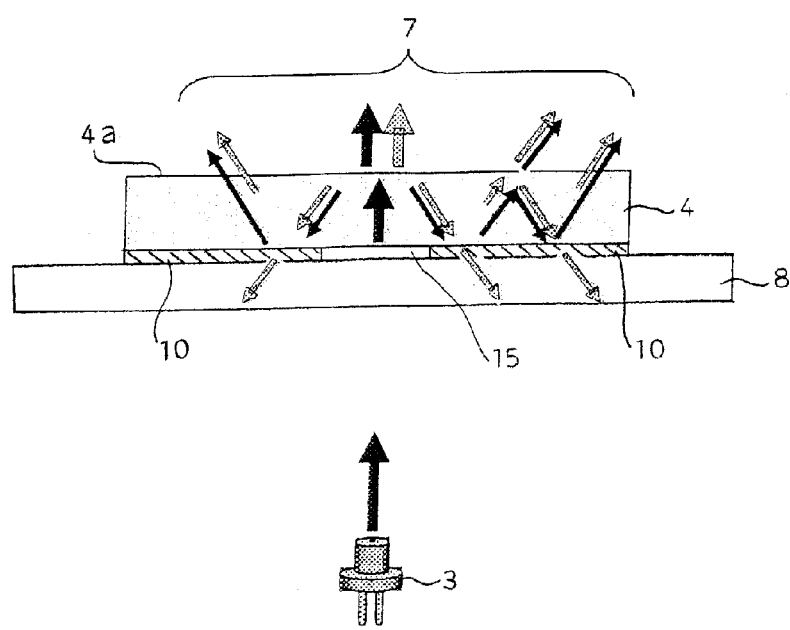
FIG. 9 is a schematic cross-sectional view illustrating a light source device according to a sixth structural example made in accordance with principles of the presently disclosed subject matter.

FIG. 9 is a schematic cross-sectional view illustrating a light source device according to a sixth structural example made in accordance with principles of the presently disclosed subject matter. Note that in FIG. 9, the components similar to those of FIGS. 4 and 5 are denoted by the same reference numerals and can have the same or similar geometric dimensions and relationships to other structures as described above with regard to similar components of other disclosed embodiments. Referring to FIG. 9, the light source device according to the sixth structural example can include the solid-state light source 3 configured to emit blue light as excitation light, and the phosphor section 4 which can be excited by the excitation light from the solid-state light source 3 so as to emit the fluorescent light (for example, yellow light) which is longer in wavelength than the light emitted from the solid-state light source. Provided between the phosphor section 4 and the solid-state light source 3 is a first region (first section) (where nothing is provided) 15 having a size within the range which is smaller than the phosphor section 4 and which is greater than the excitation light spot irradiated with the solid-state light source 3 by the amount of the handling tolerance provided for adjusting the position of the excitation light spot irradiated with the solid-state light source 3. A second region (second section) other than the first region 15 can be provided with the second wavelength selective member 10 which has the property of reflecting the excitation light from the solid-state light source 3 and transmitting the fluorescent light from the phosphor section 4.

Here, more specifically, the first region 15 can have a size (for example, diameter) which is equal to or greater than the size (for example, diameter) of the excitation light spot irradiated with the solid-state light source 3 within the range of 0.0 mm to 0.2 mm.

In the structure of FIG. 9, the excitation light from the solid-state light source 3 can be transmitted through the phosphor securing transparent body 8 and then incident upon the phosphor section 4. Part of the excitation light incident upon the phosphor section 4 can be transmitted through the phosphor section 4 and emitted from the light extraction surface 4a of the phosphor section 4. Meanwhile, the other part may be used in the phosphor section 4 to excite the phosphor section 4 to emit the fluorescent light or may be reflected by the light extraction surface 4a and directed to the second wavelength selective member 10 so as to be selectively reflected by the second wavelength selective member 10. Then, part of the reflected light of the excitation light having been selectively reflected by the second wavelength selective member 10 can be emitted from the light extraction surface 4a. Meanwhile, the other part can be reflected by the light extraction surface 4a and directed to the second wavelength selective member 10 so as to be what is called the multiple reflection light which is further selectively reflected by the second wavelength selective member 10. Here, the excitation light can excite the phosphor section 4 to cause the fluorescent light to be emitted from the phosphor section 4 when propagating through the phosphor section 4 as the aforementioned multiple reflection light. In the sixth structural example shown in FIG. 9, this allows the blue light emitting region and the yellow light emitting region from the light extraction surface 4a of the phosphor section 4 to be greater than the excitation light irradiated spot (allowing for further enhancing the efficiency of light utilization), and even when being greater than the excitation light irradiated spot, the beams of blue light and yellow light can be mixed into white light, without causing variations in radiation (variations in color). That is, in a region outside the excitation light irradiated spot, the excitation light and the fluorescent light can be emitted from the light extraction surface 4a of the phosphor section 4, while effectively preventing variations in radiation (variations in color) and further enhancing the efficiency of light utilization.

Note that in the sixth structural example shown in FIG. 9, the fluorescent light back at the second region other than the first region 15 can be transmitted through the second wavelength selective member 10 and emitted toward the solid-state light source 3. Accordingly, in the sixth structural example shown in FIG. 9, the fluorescent light from the phosphor section 4 will not turn to the multiple reflection light.

As described above, the structure of FIG. 9 can be configured such that the second region other than the first region 15 can be provided with the second wavelength selective member 10 which has the property of reflecting the excitation light from the solid-state light source 3 and transmitting the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 9 for projection under magnification onto a predetermined projection surface using a lens assembly or the like may advantageously cause little or no color variations (variations in radiation) of the light source on the projection surface.

Figure 10:
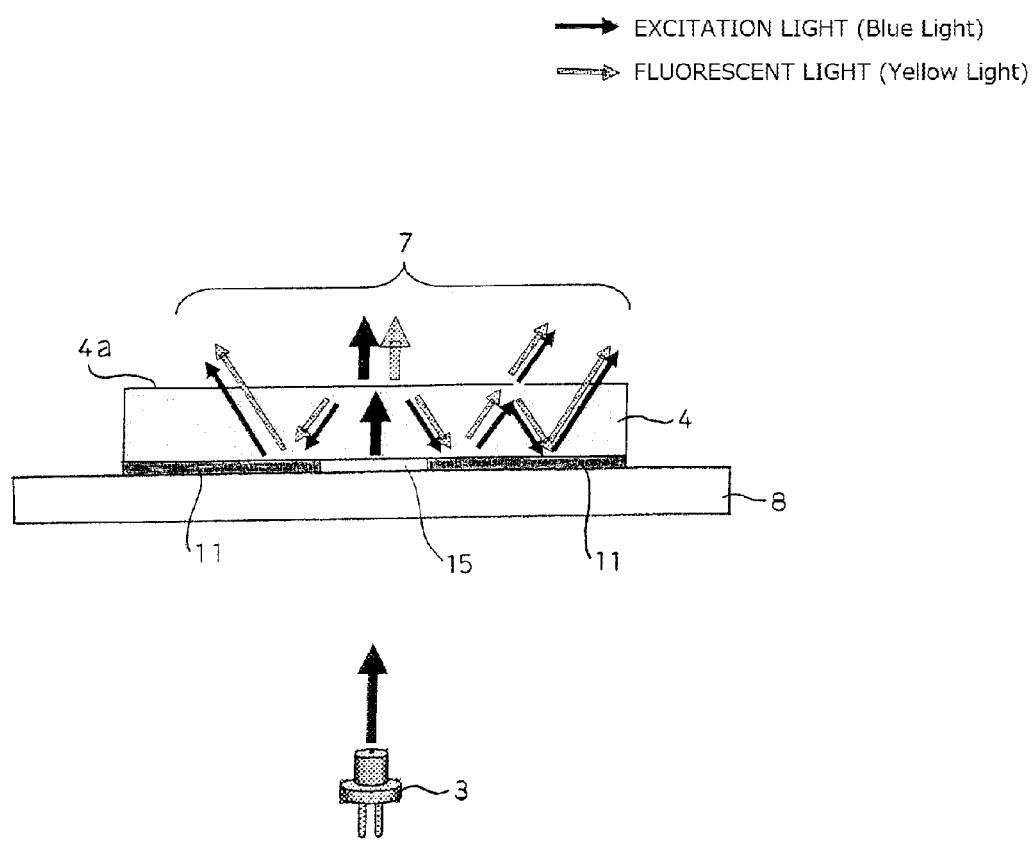
FIG. 10 is a schematic cross-sectional view illustrating a light source device according to a seventh structural example made in accordance with principles of the presently disclosed subject matter.

FIG. 10 is a schematic cross-sectional view illustrating a light source device according to a seventh structural example made in accordance with principles of the presently disclosed subject matter. Note that in FIG. 10, the components similar to those of FIGS. 6 and 9 are denoted by the same reference numerals and can have the same or similar geometric dimensions and relationships to other structures as described above with regard to similar components of other disclosed embodiments. Referring to FIG. 10, the light source device according to the seventh structural example can be configured such that in the light source device according to the sixth structural example, the reflective member 11 can be provided in place of the second wavelength selective member 10.

In the structure of FIG. 10, the excitation light from the solid-state light source 3 can be transmitted through the phosphor securing transparent body 8 and then incident upon the phosphor section 4. Part of the excitation light incident upon the phosphor section 4 can be transmitted through the phosphor section 4 and emitted from the light extraction surface 4a of the phosphor section 4. Meanwhile, the other part may be used in the phosphor section 4 to excite the phosphor section 4 to emit the fluorescent light or may be reflected by the light extraction surface 4a and directed to the reflective member 11 so as to be reflected by the reflective member 11. Then, part of the reflected light of the excitation light having been reflected by the reflective member 11 can be emitted from the light extraction surface 4a, whereas the other part can be reflected by the light extraction surface 4a and directed to the reflective member 11 so as to be what is called multiple reflection light which is further reflected by the reflective member 11.

Furthermore, in the structure of FIG. 10, the fluorescent light back at a region other than the region 15 can be reflected by the reflective member 11. Then, part of the reflected light of the fluorescent light having been reflected by the reflective member 11 can be emitted from the light extraction surface 4a, whereas the other part can be reflected by the light extraction surface 4a and directed to the reflective member 11 so as to be what is called the multiple reflection light which is further reflected by the reflective member 11.

As such, in the structure of FIG. 10, both the excitation light and the fluorescent light can be turned into multiple reflection light, so that even in a region outside the excitation light irradiated spot, the excitation light and the fluorescent light can be emitted from the light extraction surface 4a of the phosphor section 4 (even in a region greater than the excitation light irradiated spot, the beams of blue light and yellow light are mixed into white light). This allows for effectively preventing variations in radiation (variations in color) and further enhancing the efficiency of light utilization.

As described above, in the structure of FIG. 10, the second region other than the first region 15 can be provided with the reflective member 11 to reflect the excitation light from the solid-state light source 3 and the fluorescent light from the phosphor section 4. This makes it possible to further enhance the efficiency of light utilization as well as effectively prevent variations in radiation (variations in color) occurring in the structure of FIG. 1.

Accordingly, a lighting device which incorporates the light source device of FIG. 10 for projection under magnification onto a predetermined projection surface using a lens assembly or the like may advantageously cause little or no color variations (variations in radiation) of the light source on the projection surface.

Note that each of the structural examples described above can employ, as the solid-state light source 3, light-emitting diodes or laser diodes (semiconductor lasers) which can emit light at wavelengths in the blue light region. For example, it is possible to use a laser diode which is made of a GaN-based material and emits blue light at about 460 nm.

Furthermore, in each of the aforementioned structural examples, the fluorescent light emitted from the phosphor section 4 is yellow light. However, the fluorescent light emitted from the phosphor section 4 may also be a mixture, for example, of red light and green light.

That is, the phosphor section 4 can contain at least one type of phosphors which can be excited by the excitation light from the solid-state light source 3 and emit fluorescent light at a wavelength longer than the wavelength of the light emitted from the solid-state light source 3. More specifically, for the solid-state light source 3 emitting blue light, the phosphor section 4 can contain at least one type of phosphors, for example, green, red, and yellow ones. For the solid-state light source 3 emitting blue light and the phosphor section 4 containing, for example, only a yellow phosphor, the phosphor section 4 can be irradiated with the blue light from the solid-state light source 3 so as to mix the blue light and the yellow light into white light. Furthermore, when the solid-state light source 3 emits blue light and the phosphor section 4 contains, for example, green and red phosphors (with the green and red phosphors uniformly dispersed and mixed with each other), the blue light, red light, and green light can be mixed into white light when the phosphor section 4 is irradiated with the blue light from the solid-state light source 3.

More specifically, for example, assume that the solid-state light source 3 is a light-emitting diode or a semiconductor laser of a GaN-based material which emits blue light at a wavelength of about 460 nm, and that the phosphor section 4 is excited with the blue light at wavelengths of about 440 nm to about 470 nm. In this case, examples of the material for the phosphor section 4 may include: $CaAlSiN_3:Eu^{2+}$, $Ca_2Si_5N_8$: $Eu^{2+}$, $KSiF_6:Mn^{4+}$, and $KTiF_6:Mn^{4+}$ as a red phosphor; and $Lu_3Al_5O_{12}:Ce^{3+}$, $Y_3(Ga, Al)_5O_{12}:Ce^{3+}$, $Ca_3Sc_2Si_3O_{12}:Ce^{3+}$, $CaSc_2O_4:Eu^{2+}$, $(Ba, Sr)_2SiO_4:Eu^{2+}$, $Ba_3Si_6O_{12}N_2:Eu^{2+}$, and $(Si, Al)_6(O, N)_8:Eu^{2+}$ as a green phosphor. Meanwhile, assuming that the excitement is carried out with the blue light at a wavelength of about 440 nm to 470 nm, examples of the material for the yellow phosphor may include $Y_3Al_5O_{12}$: $Ce^{3+}$ (YAG), $(Sr, Ba)_2SiO_4:Eu^{2+}$, and $Ca_x(Si, Al)_{12}(O, N)_{16}$: $Eu^{2+}$.

Furthermore, in each of the aforementioned structural examples, the phosphor section 4 can be obtained by dispersing a phosphor in a highly transparent resin such as a silicone resin or applying the phosphor thereto in order to reduce the costs or improve the processability of the material. However, if a higher heat resistance is desired, it can be advantageous to disperse phosphor powder into glass, dope glass with the light emission center, or employ a ceramic phosphor.

Furthermore, in each of the aforementioned structural examples, the wavelength selective member 6 to be employed can be formed into a mirror surface by alternately stacking dielectric substances of different refractive indexes in layers so as to have the property of transmitting the excitation light from the solid-state light source 3 and reflecting the fluorescent light (for example, yellow light) from the phosphor section 4. Furthermore, the second wavelength selective member 10 to be employed can be formed into a mirror surface by alternately stacking dielectric substances of different refractive indexes in layers so as to have the property of reflecting the excitation light from the solid-state light source 3 and transmitting the fluorescent light (for example, yellow light) from the phosphor section 4. Furthermore, metal layers such as of aluminum or silver or optical multi-layered films such as of titanium oxide or silicon dioxide stacked in layers can be employed as the reflective member 11 to reflect the excitation light that has been diffused when transmitting through the phosphor section 4 and the fluorescent light (for example, yellow light) that has been excited by the excitation light. Furthermore, the antireflective member 9 to be employed as an AR coat may include an optical multi-layered film which is made of, for example, titanium oxide or silicon dioxide stacked in layers and has an antireflective function.

Furthermore, in each of the aforementioned structural examples, to secure and use the phosphor section 4 (for example, without rotation), the phosphor section 4 can be surrounded with a substance of a high cooling efficiency (for example, metal) so as to radiate the heat generated by the phosphor section 4 through the peripheral portion, thereby preventing degradation in conversion efficiency of the phosphor section 4. That is, since the phosphor generates heat when converting light and the phosphor has the temperature quenching property of causing a drop in conversion efficiency due to an increase in ambient temperature, the heat generated by the phosphor section 4 can be radiated through the peripheral portion, thereby preventing degradation in conversion efficiency of the phosphor section 4.

Figure 11:
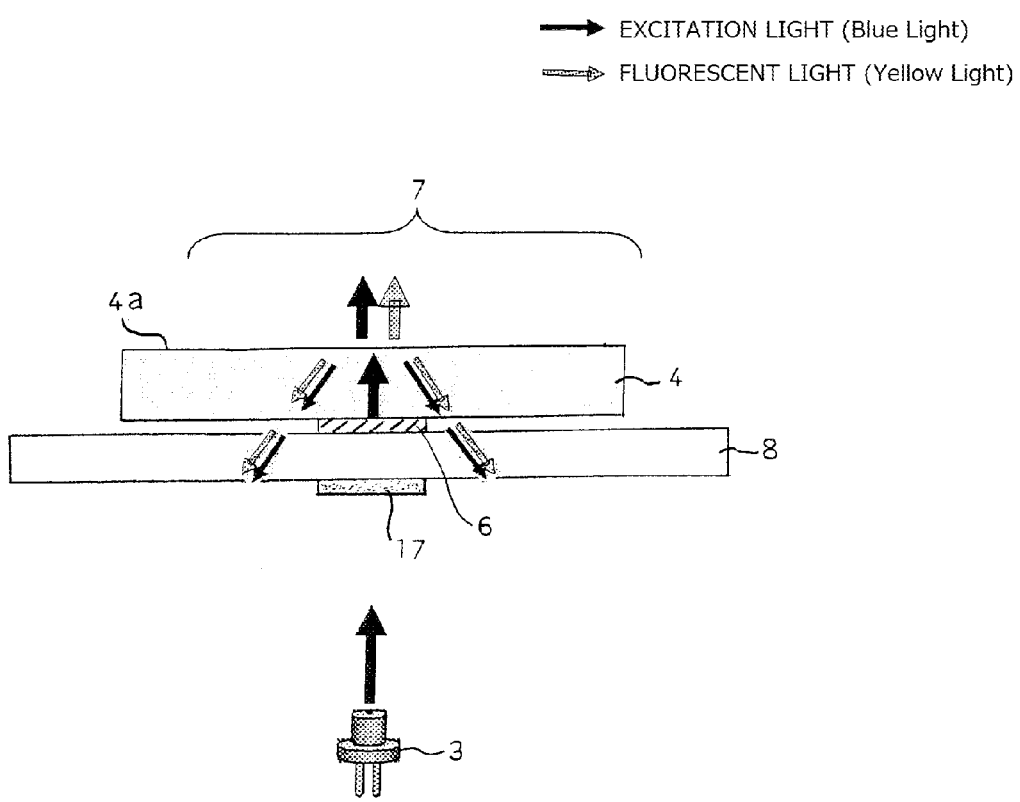
FIG. 11 is a schematic cross-sectional view illustrating a structural example in which a phosphor securing transparent body is provided on the surface thereof with an antireflective member configured to prevent the reflection of excitation light (blue light) from a solid-state light source when entering the phosphor securing transparent body.

Furthermore, in each of the aforementioned structural examples, the phosphor section 4 to be employed can have a thickness, for example, of about 100 μm. However, an extremely thin phosphor of a thickness of 100 μm or less can be desirably reinforced because the phosphor tends to readily break and cause a strength problem. For example, the phosphor section 4 can be affixed to the phosphor securing transparent body 8 (for example, a transparent body like a piece of sapphire glass) as shown in FIGS. 4 to 10, thereby reinforcing the phosphor section 4. Note that in the case of employing the phosphor securing transparent body 8 as shown in FIGS. 4 to 10, the surface of the phosphor securing transparent body 8 can be provided, for example, as shown in FIG. 11 (note that FIG. 11 corresponds to FIG. 4), with the antireflective member (for example, antireflective film (AR coating)) 17 configured to prevent the reflection of the excitation light from the solid-state light source 3 upon entry to the phosphor securing transparent body 8. Here, the antireflective member 17 can have a size within the range which is greater than the excitation light spot irradiated with the solid-state light source 3 by the amount of the handling tolerance provided for adjusting the position of the excitation light spot irradiated with the solid-state light source 3. More specifically, the antireflective member 17 can have a size (for example, diameter or peripheral length) which is equal to or greater than the size (for example, diameter or peripheral length) of the excitation light spot irradiated with the solid-state light source 3 within the range of 0.0 mm to 0.2 mm.

Figure 12:
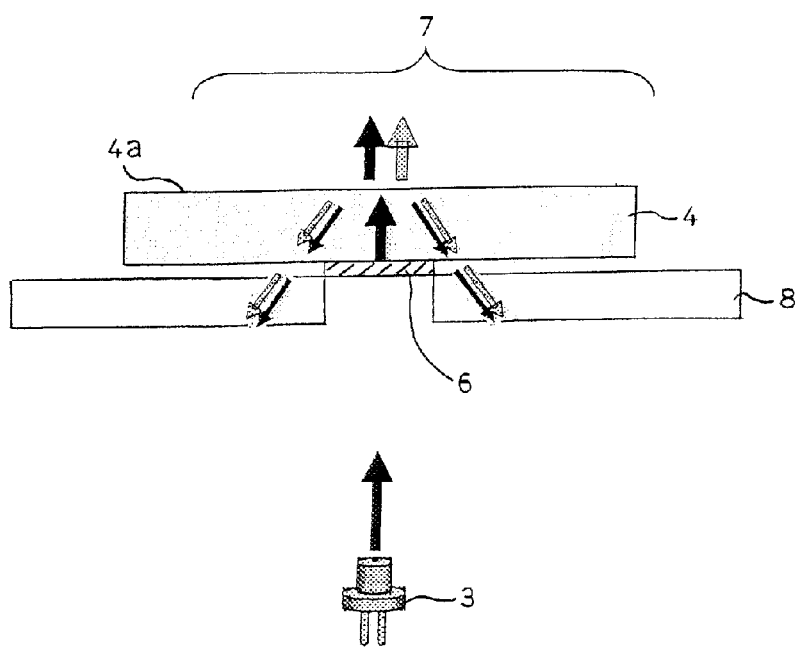
FIG. 12 is a schematic cross-sectional view illustrating a structural example in which a phosphor securing transparent body is formed in the shape of doughnut so as not to allow the phosphor securing transparent body to exist in the region having the size of the spot irradiated with excitation light from the solid-state light source.

Furthermore, to provide the phosphor securing transparent body 8 as shown in FIGS. 4 to 10, the phosphor securing transparent body 8 can be formed, for example, as shown in FIG. 12 (note that FIG. 12 corresponds to FIG. 4), in the shape of doughnut so that the phosphor securing transparent body does not exist within the region which is the same in size as the excitation light spot irradiated with the solid-state light source 3.

Figure 13:
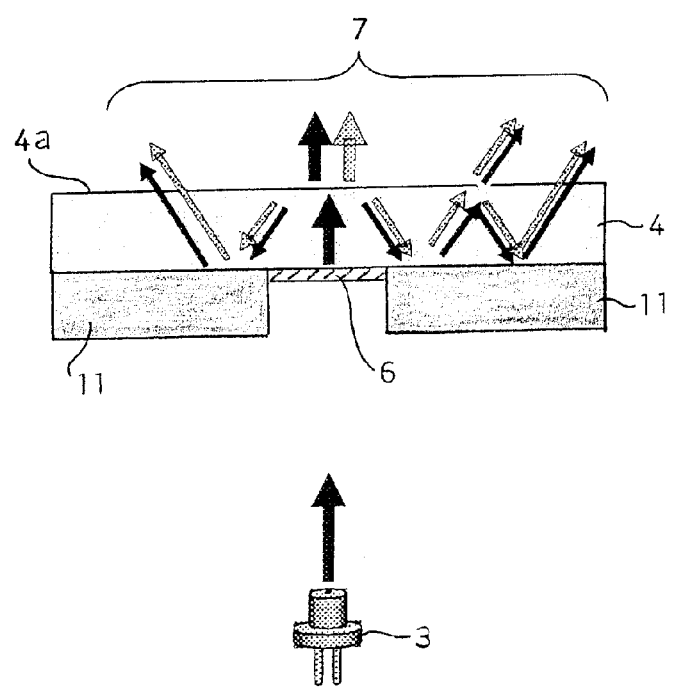
FIG. 13 is a schematic cross-sectional view illustrating a structural example in which the reflective member provided as shown in FIGS. 6, 8, and 10 is replaced with another reflective structure.

Furthermore, when the reflective member 11 as in FIGS. 6, 8, and 10 is employed, it is possible to use, as the reflective member 11 as shown in FIG. 13 (note that FIG. 13 corresponds to FIG. 6) in place of the doughnut-shaped phosphor securing transparent body 8 shown in FIG. 12, a doughnut-shaped metal plate of a high reflectivity, such as of silver or aluminum, which also serves as the reinforcement of the phosphor section 4.

The presently disclosed subject matter is applicable to lighting devices for vehicles, such as headlights, projectors, and for lighting units in general illumination applications.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A light source device, comprising:
    a solid-state light source configured to emit blue light as excitation light;
    a wavelength conversion section configured to be excited by the excitation light from the solid-state light source so as to emit fluorescent light longer in wavelength than the excitation light emitted from the solid-state light source and to include a light extraction surface through which light exits; and
    a wavelength selective structure located between the wavelength conversion section and the solid-state light source and configured to transmit the excitation light from the solid-state light source and to reflect the fluorescent light from the wavelength conversion section, the wavelength selective structure having a size within a range which is less than a size of the wavelength conversion section and which is greater than a size of a spot of the excitation light irradiated with the solid-state light source by an amount of a handling tolerance provided for adjusting a position of the spot of the excitation light irradiated with the solid-state light source, wherein
    a region which is located between the wavelength conversion section and the solid-state light source and other than a region where the wavelength selective structure is located includes a second wavelength selective structure located on the same plane as the wavelength selective structure and configured to reflect the excitation light from the solid-state light source and to transmit the fluorescent light from the wavelength conversion section, and
    part of the excitation light incident upon the wavelength conversion section is reflected by the light extraction surface of the wavelength conversion section toward the second wavelength selective structure so as to be selectively reflected by the second wavelength selective structure.

2. The light source device according to claim 1, wherein the wavelength selective structure has a size which is equal to or greater than the size of the spot of the excitation light irradiated with the solid-state light source within a range of 0.0 mm to 0.2 mm.

3. A light source device, comprising:
    a solid-state light source configured to emit blue light as excitation light;
    a wavelength conversion section configured to be excited by the excitation light from the solid-state light source so as to emit fluorescent light longer in wavelength than the excitation light emitted from the solid-state light source and to include a light extraction surface through which light exits; and
    an antireflective structure located between the wavelength conversion section and the solid-state light source, the antireflective structure configured to prevent the reflection of the excitation light from the solid-state light source upon being incident on the wavelength conversion section, the antireflective structure having a size within a range which is less than a size of the wavelength conversion section and which is greater than a size of a spot of the excitation light irradiated with the solid-state light source by an amount of a handling tolerance provided for adjusting a position of the spot of the excitation light irradiated with the solid-state light source, wherein
    a region which is located between the wavelength conversion section and the solid-state light source and other than a region where the antireflective structure is located includes a second wavelength selective structure located on the same plane as the antireflective structure and configured to reflect the excitation light from the solid-state light source and to transmit the fluorescent light from the wavelength conversion section, and
    part of the excitation light incident upon the wavelength conversion section is reflected by the light extraction surface of the wavelength conversion section toward the second wavelength selective structure so as to be selectively reflected by the second wavelength selective structure.

4. The light source device according to claim 3, wherein the antireflective structure has a size which is equal to or greater than the size of the spot of the excitation light irradiated with the solid-state light source within a range of 0.0 mm to 0.2 mm.

5. A light source device, comprising:
- a solid-state light source configured to emit blue light as excitation light;
- a wavelength conversion section configured to be excited by the excitation light from the solid-state light source so as to emit fluorescent light longer in wavelength than the excitation light emitted from the solid-state light source and to include a light extraction surface through which light exits;
- a first section located between the wavelength conversion section and the solid-state light source, the first section having a size within a range which is less than a size of the wavelength conversion section and which is greater than a size of a spot of the excitation light irradiated with the solid-state light source by an amount of a handling tolerance provided for adjusting a position of the excitation light spot irradiated with the solid-state light source;
- a second section other than the first section, the second section including a second wavelength selective structure located on the same plane as the first section and configured to reflect the excitation light from the solid-state light source and to transmit the fluorescent light from the wavelength conversion section, and
- wherein part of the excitation light incident upon the wavelength conversion section is reflected by the light extraction surface of the wavelength conversion section toward the second wavelength selective structure so as to be selectively reflected by the second wavelength selective structure.

6. The light source device according to claim 5, wherein the first section has a size which is equal to or greater than the size of the spot of the excitation light irradiated with the solid-state light source within a range of 0.0 mm to 0.2 mm.

7. A lighting device, comprising the light source device as set forth in claim 5.

8. A lighting device, comprising the light source device as set forth in claim 3.

9. A lighting device, comprising the light source device as set forth in claim 1.

10. The light source device according to claim 1, wherein the wavelength selective structure is configured such that the entire wavelength selective structure is concealed behind the wavelength conversion section when viewed from a front of the light source device and along an optical axis of the light source device.

11. The light source device according to claim 1, wherein the wavelength selective structure is formed with a circular periphery, and the size of the wavelength selective structure is a diameter of the circular periphery.

12. The light source device according to claim 1, wherein the wavelength selective structure includes an outermost periphery defining an outermost extent of the wavelength selective structure, and the size of the wavelength selective structure is a length of the outermost periphery, and the wavelength conversion section includes an outermost periphery defining an outermost extent of the wavelength conversion section, and the size of the wavelength conversion section is a length of the outermost periphery of the wavelength conversion section.

13. The light source device according to claim 3, wherein the antireflective structure is configured such that the entire antireflective structure is concealed behind the wavelength conversion section when viewed from a front of the light source device and along an optical axis of the light source device.

14. The light source device according to claim 3, wherein the antireflective structure is formed with a circular periphery, and the size of the antireflective structure is a diameter of the circular periphery.

15. The light source device according to claim 3, wherein the antireflective structure includes an outermost periphery defining an outermost extent of the antireflective structure, and the size of the antireflective structure is a length of the outermost periphery, and the wavelength conversion section includes an outermost periphery defining an outermost extent of the wavelength conversion section, and the size of the wavelength conversion section is a length of the outermost periphery of the wavelength conversion section.

16. The light source device according to claim 5, wherein the first section is configured such that the entire first section is concealed behind the wavelength conversion section when viewed from a front of the light source device and along an optical axis of the light source device.

17. The light source device according to claim 5, wherein the first section is formed with a circular periphery, and the size of the first section is a diameter of the circular periphery.

18. The light source device according to claim 5, wherein the first section includes an outermost periphery defining an outermost extent of the first section, and the size of the first section is a length of the outermost periphery, and the wavelength conversion section includes an outermost periphery defining an outermost extent of the wavelength conversion section, and the size of the wavelength conversion section is a length of the outermost periphery of the wavelength conversion section.

* * * * *